US009136598B2

(12) United States Patent
Yin

(10) Patent No.: US 9,136,598 B2
(45) Date of Patent: Sep. 15, 2015

(54) DIRECTIONAL ADJUSTMENT OF VOLTAGE-CONTROLLED PHASED ARRAY STRUCTURES

(75) Inventor: Xuefeng Yin, Shanghai (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 873 days.

(21) Appl. No.: 13/129,879

(22) PCT Filed: Jun. 18, 2010

(86) PCT No.: PCT/CN2010/074051

§ 371 (c)(1), (2), (4) Date: May 18, 2011

(87) PCT Pub. No.: WO2011/156964

PCT Pub. Date: Dec. 22, 2011

(65) Prior Publication Data

US 2011/0316745 A1 Dec. 29, 2011

(51) Int. Cl.

| | |
|---|---|
| ***H01Q 3/00*** | (2006.01) |
| ***G01S 13/00*** | (2006.01) |
| ***H01Q 3/44*** | (2006.01) |
| ***H01Q 1/24*** | (2006.01) |

(52) U.S. Cl.

CPC ............... *H01Q 3/443* (2013.01); *H01Q 1/243* (2013.01)

(58) Field of Classification Search

USPC ............ 342/81, 157, 368, 370, 372; 343/787; 310/365

See application file for complete search history.

(56) References Cited

U.S. PATENT DOCUMENTS

| | | | |
|---|---|---|---|
| 7,522,114 | B2 | 4/2009 | Brown |
| 8,204,507 | B2 | 6/2012 | Yu et al. |
| 8,699,372 | B2 | 4/2014 | Guo |
| 2003/0179138 | A1 | 9/2003 | Chen |
| 2006/0256014 | A1 | 11/2006 | Sengupta et al. |
| 2007/0105594 | A1 | 5/2007 | Burkert et al. |
| 2008/0076477 | A1 | 3/2008 | Hedayat et al. |
| 2010/0073232 | A1 | 3/2010 | Cummer et al. |

FOREIGN PATENT DOCUMENTS

| | | | |
|---|---|---|---|
| CN | 1585297 | A | 2/2005 |
| CN | 101094021 | A | 12/2007 |
| CN | 101237267 | A | 8/2008 |
| CN | 101501927 | A | 8/2009 |
| JP | 2006-211328 | | 8/2006 |
| JP | 2007-081825 | | 3/2007 |
| JP | 2007-525065 | A | 8/2007 |
| JP | 2009-535942 | A | 10/2009 |
| WO | 9836595 | A1 | 8/1998 |
| WO | 2004114546 | A1 | 12/2004 |

(Continued)

OTHER PUBLICATIONS

International Search Report and Written Opinion of PCT/CN2010/074051, Mar. 24, 2011, pp. 1-12, The State Intellectual Property Office, Beijing, China.

(Continued)

*Primary Examiner* — Dao Phan

(74) *Attorney, Agent, or Firm* — Brundidge & Stanger, P.C.

(57) ABSTRACT

Implementations and techniques for directional adjustment of voltage-controlled phased array structures are generally disclosed.

29 Claims, 8 Drawing Sheets

(56) References Cited

FOREIGN PATENT DOCUMENTS

| | | | |
|---|---|---|---|
| WO | 2007127955 | A2 | 11/2007 |
| WO | 2008115881 | A1 | 9/2008 |
| WO | 2010130166 | A1 | 11/2010 |

OTHER PUBLICATIONS

New EU project on ferroelectric films, nanotechwire.com, Dec. 18, 2005, accessed at http://www.nanotechwire.com/news.asp?nid=2701&ntid=115&pg=103 on Apr. 21, 2011.

Wang, Youzhen, et al., Direct observation of negative phase velocity and positive group velocity in time domain for composite right/left-handed transmission lines, Journal of Applied Physics, Dec. 2006, vol. 100, Issue 11, pp. 113503-113503-4, American Institute of Physics, College Park, Maryland.

Wang, Pengchun, et al., Analysis of frequency-fixed beam-scanning leaky-wave antenna based on composite left-right transmission line, Pohl Institute of Solid State Physics, Tongji University, Shanghai, 200092, 2007.

Modelski, J. and Y. Yashchyshyn, Voltage-controlled ferroelectric microstrip antenna for phased arrays, IEEE Antennas and Propagation Society International Symposium, 2000, vol. 2, p. 506-509, Salt Lake City, UT.

"Maximizing LTE Performance Through MIMO Optimization," Pctel, White Paper, pp. 1-14 (Apr. 2011).

Abdulrazak, L. F. et al., "New Algorithm to Improve the Coexistence between IMT-Advanced Mobile Users and Fixed Satellite Service," 2009 International Conference on Machine Learning and Computing, IPCSIT, IACSIT Press, Singapore, vol. 3, pp. 294-301 (2011).

Bartlett, M "Smoothing periodograms from time series with continuous spectra," Nature, vol. 161, pp. 686-687 (1948).

Bhagavatula, R. & Heath, R., Jr. , "Adaptive Limited Feedback for Sum-Rate Maximizing Beamforming in Cooperative Multicell Systems," Signal Processing, IEEE Transactions on, Feb. 2011, vol. 59, No. 2, pp. 800-811.

Fleury, B. H., "Channel Parameter Estimation in Mobile Radio Environments Using the SAGE Algorithm," IEEE Journal on Selected Areas in Communications, vol. 17, No. 3, pp. 434-450 (1999).

Gaokar, R. and Cheeran, A., Dr., "Performance Analysis of Beamforming Algorithms," IJECT, vol. 2, No. 1, Mar. 2011, pp. 43-48.

International search report and written opinion for PCT Publication No. PCT/CN2014/071115 mailed Apr. 23, 2014.

Park, J. S. et al., "SPACE-MAC: Enabling Spatial Reuse using MIMO channel-aware MAC," Communications, 2005 IEEE International Conference on, vol. 5, May 16-20, 2005, pp. 3642-3646.

Razavilar, J. et al., "Joint beamforming and handoff for traffic improvements in wireless networks," IEEE International Conference on Communications, vol. 1, pp. 41-45 (1999).

Xie, N., et al., "Multi-pair Physical Layer Network Coding with Beamforming Systems," IEEE Wireless Communications and Networking Conference (WCNC), pp. 1-5 (2012).

Yin, X. et al., "Tracking of Time-Variant Radio Propagation Paths Using Particle Filtering," IEEE International Conference on Communications, pp. 920-924 (2008).

International Search Report and Written Opinion for International Application No. PCT/CN13/083067 mailed Jun. 4, 2014.

DIRECTIONAL ADJUSTMENT OF VOLTAGE-CONTROLLED PHASED ARRAY STRUCTURES

CROSS-REFERENCE TO RELATED APPLICATION

This Application is the National Stage filing under 35 U.S.C. §371 of PCT Application Ser. No. PCT/CN10/74051 filed on Jun. 18, 2010.

BACKGROUND

Multiple antennas technologies may be utilized for mobile communications. Some conventional approaches of using multiple antennas for mobile communication may rely on the decorrelation properties of the signals observed at different antennas.

SUMMARY

This disclosure is drawn to methods, apparatus, and systems related to directional adjustment of voltage-controlled phased array structures. Implementations and techniques for directional adjustment of voltage-controlled phased array structures may include identifying a beginning of a data frame of a signal received by a mobile wireless communication device. A voltage-controlled phased array of a plurality of composite right/left-hand (CRLH)-type leaky-wave antennas associate with the mobile wireless communication device may be excited with time-varying voltage levels after the beginning of the data frame. A directional power spectrum may be determined based at least in part on the time-varying voltage levels. A direction may be determining based at least in part on the directional power spectrum. A working voltage may be determined to excite the voltage-controlled phased array portion of the mobile wireless communication device, in which the working voltage corresponds with the determined direction.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
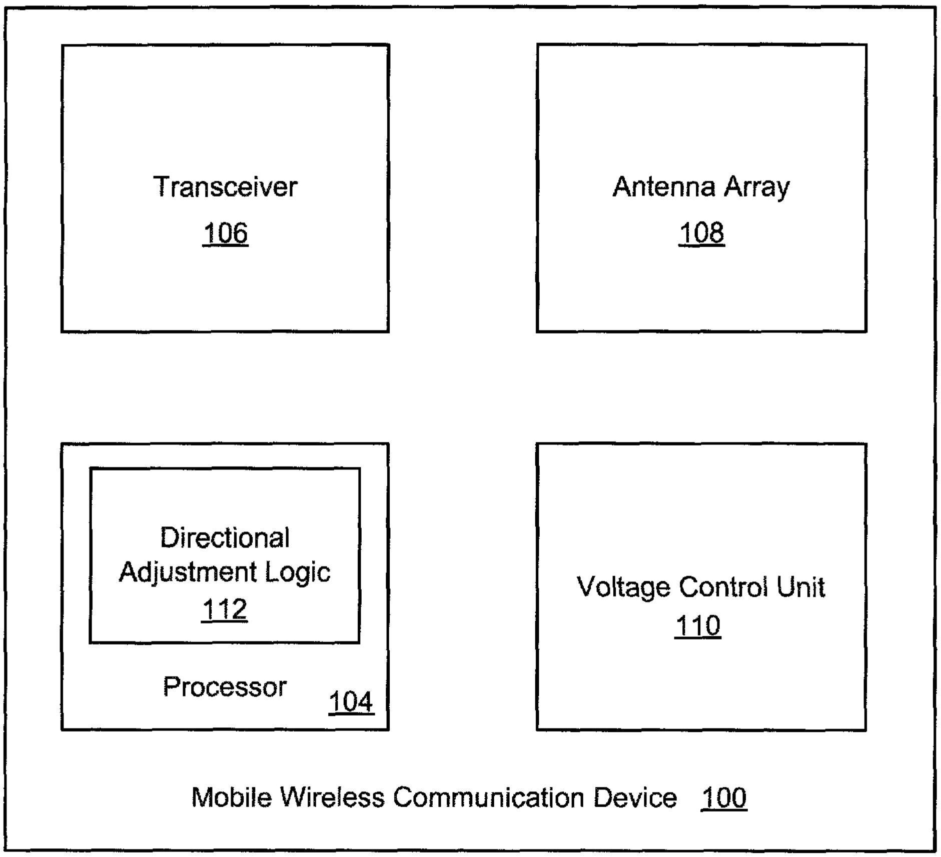
FIG. 1 illustrates an example mobile wireless communication device for wireless communications.

The following description sets forth various examples along with specific details to provide a thorough understanding of the claimed subject matter. It will be understood by those skilled in the art, however, that the claimed subject matter may be practiced without some or more of the specific details disclosed herein. Further, in some circumstances, well-known methods, procedures, systems, components and/or circuits have not been described in detail in order to avoid unnecessarily obscuring the claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, separated, and designed in a wide variety of different configurations, all of which are explicitly contemplated and make part of this disclosure.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

This disclosure is drawn, inter alia, to methods, apparatus, and systems related to directional adjustment of voltage-controlled phased array structures.

The conventional approaches of using multiple antennas for mobile communication may rely on the decorrelation properties of the signals observed at different antennas, rather than the directional characteristics of the signals. Further, antenna arrays that might be utilized for determining directional information of signals may typically be too big for mobile wireless communication devices. In examples discussed below, a voltage-controlled phased array may be designed sufficiently small such that it can be incorporated into mobile wireless communication devices for directional adjustment of signal reception.

As used herein the term “mobile (or portable) wireless communication device” may refer to a small-form factor portable electronic device capable of wireless communication such as, for example, a cell phone, a personal data assistant (PDA), a personal media player device, a wireless web-watch device, a personal headset device, an application specific device, the like, and/or combinations thereof.

FIG. 1 illustrates an example mobile wireless communication device 100 for wireless communications arranged in accordance with at least some embodiments of the present disclosure. Mobile wireless communication device 100 may be used to perform some or all of the various functions discussed below in connection with FIG. 2 and/or FIG. 5. Mobile wireless communication device 100 may include any device or collection of devices capable of undertaking wireless communications in a network.

As depicted in FIG. 1, mobile wireless communication device 100 may include a processor 104, a transceiver 106, an antenna array 108, and a voltage control unit 110. Further, mobile wireless communication device 100 may also include additional items such as memory, a router, network interface logic, etc. that have not been shown in FIG. 1 for the sake of clarity. For example, processor 104 may be a microprocessor or Central Processing Unit (CPU). In other implementations, processor 104 may be an Application Specific Integrated Circuit (ASIC), a Field Programmable Gate Array (FPGA), a digital signal processor (DSP), or other integrated formats.

Transceiver 106 may, in some implementations, be a radio frequency-type (RF) transceiver. Also, while an RF transceiver is one example of transceiver 106, claimed subject matter is not limited in this regard and mobile wireless communication device 100 may, for example, employ a discrete RF receiver and RF transmitter circuitry.

Antenna array 108 may include multiple leaky-wave antennas formed from composite right/left-hand (CRLH) transmission lines. Such CRLH-type leaky-wave antennas may be formed from a selection of metamaterials. Such metamaterials may be synthetic or artificial materials that exhibit negative effective permittivity and magnetic permeability. Different approaches may be used to construct such metamaterials. For example, a composite medium based on a periodic array of interspaced conducting nonmagnetic split ring resonators and continuous wires may exhibit such negative values of effective permittivity and magnetic permeability in the microwave band. In another example, metamaterials may be fabricated by adding periodic series capacitors along transmission lines.

In one example, such CRLH-type leaky-wave antennas may have a carrier frequency adapted to the bands where the cellular systems operate. For example, for commercial cellular systems, e.g., GSM systems, CDMA systems, and/or 3G systems, such CRLH-type leaky-wave antennas may have a carrier frequency operating in frequency bands from 2.75 GHz and 3.0 GHz. The carrier frequency of such CRLH-type leaky-wave antennas may be adjusted by, for example, modifying the distributed inductance of an LC circuit (e.g., a resonant circuit or tuned circuit including an inductor, represented by the letter L, and a capacitor, represented by the letter C). In another example, antenna array 108 constructed by using multiple CRLH-type leaky-wave antennas may have a beam-scanning region above 80 degrees, such as a beam-scanning region of 120 degrees, for example. Such a beam-scanning region above 80 degrees may be utilized to detect signals in an expanded space around the antenna. For example, the scanning region of such antenna array 108 may be controlled by allocating different values for the capacitors in the CRLH-type leaky-wave antennas. In a further example, antenna array 108 may have fewer than (or more than) thirty CRLH-type leaky-wave antennas. For example, antenna array 108 may have between three and twenty-five CRLH-type leaky-wave antennas.

Voltage control unit 110 may be operably coupled to antenna array 108. Antenna array 108 may be controlled via voltage control unit 110 to operate as a voltage-controlled phased array (accordingly, antenna array 108 may be referred to herein as voltage-controlled phased 108). Antenna array 108 may be oriented and arranged as a voltage-controlled phased array in various ways. In one example, antenna array 108 may be constructed of multiple micro-strip antennas. In this example, each individual antenna may have a multilayered structure located on a conductive plate. In the multilayered structure, a thin ferroelectric tape may be sandwiched between two dielectric slabs. The shape of the tape can be rectangular, round, triangular, and/or the like, for example. By exciting the ferroelectric tape with different DC voltages, the dielectric constant of the ferroelectric tape can be changed, so that the overall radiation pattern of the entire antenna array 108 is adaptable. Such an adaptive radiation pattern may be utilized to receive signals at specific directions, in order to suppress interference and improve the quality of received signals. For example, antenna array 108 may include CRLH-type leaky-wave antennas that may be formed by adding periodic series capacitors along transmission lines, so that the overall radiation pattern of the entire antenna array 108 may be adaptable based on voltage changes that control the values of capacitors.

Mobile wireless communication device 100 may also include directional adjustment logic 112 that may be configured to undertake any of the operations of FIG. 2 and/or FIG. 5, as will be discussed in further detail below. Directional adjustment logic 112 may provide any of the functionality described herein and claimed subject matter is not limited to specific types or manifestations of processing logic. Processor 104 may receive an indication of one or more selected channels in the form of a signal 114 obtained via antenna array 108 and transceiver 106.

Figure 2:
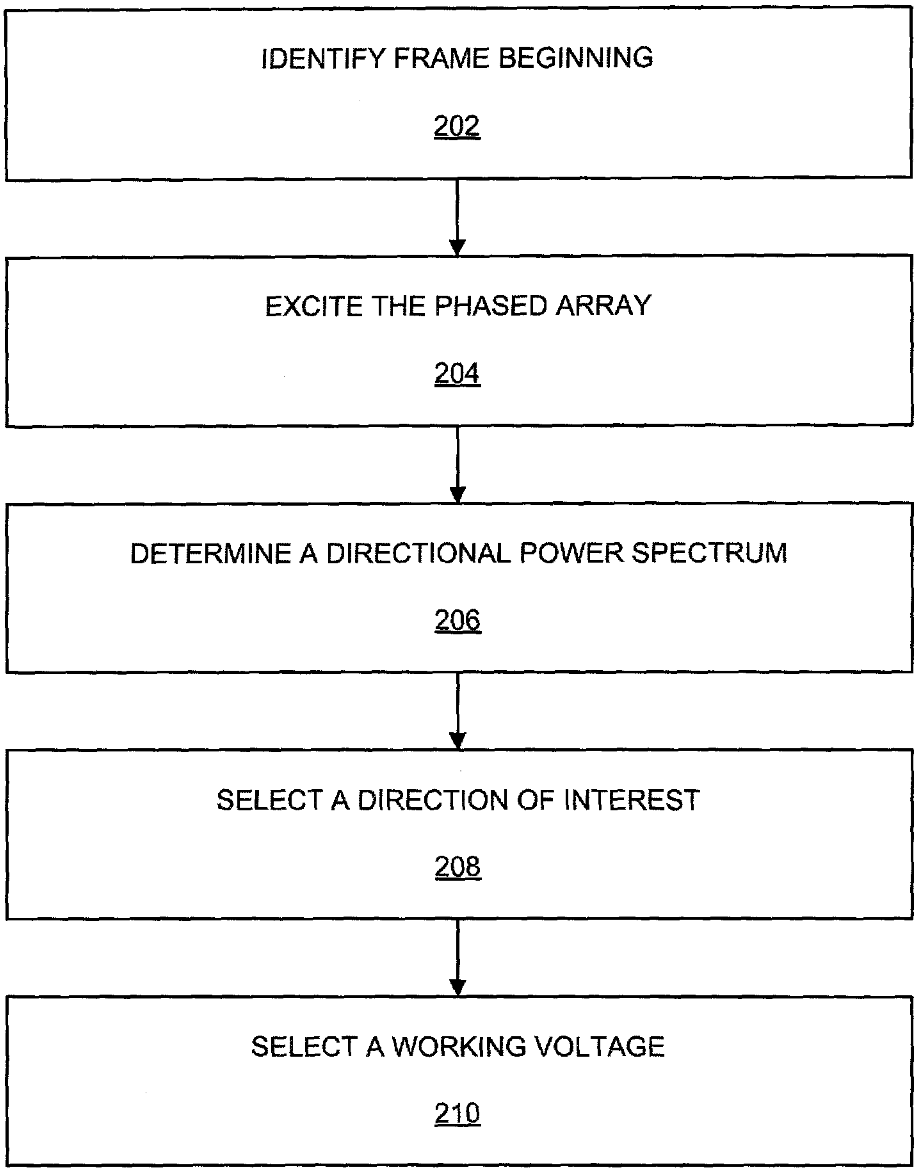
FIG. 2 illustrates an example process for directional adjustment of voltage-controlled phased array structures.

FIG. 2 illustrates an example process 200 for directional adjustment of voltage-controlled phased array structures that is arranged in accordance with at least some embodiments of the present disclosure. In the illustrated example, process 200, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 2 may be practiced in various implementations. For example, although process 200, as shown in FIG. 2, depicts one particular order of blocks or actions, the order in which these blocks or actions are presented does not necessarily limit claimed subject matter to any particular order. Likewise, intervening actions not shown in FIG. 2 and/or additional actions not shown in FIG. 2 may be employed and/or some of the actions shown in FIG. 2 may be eliminated, without departing from the scope of claimed subject matter. Process 200 may include one or more of operations as illustrated by blocks 202, 204, 206, 208 and/or 210.

As illustrated, process 200 may be implemented for directional adjustment of voltage-controlled phased array structures. Process 200 may be utilized in downlink communications, such as in mobile wireless communication device 100 (FIG. 1), for example. Processing may begin at block 202, "identify frame beginning", where a beginning of a data frame may be determined. For example, a beginning of a data frame of a signal received by a mobile wireless communication device may be determined based at least in part on one or more prefix symbols. In one example, signals may be transmitted and received in a Time-Division Duplex (TDD) structure. Under such a TDD structure, prefix symbols known to both transmitter and receiver may be embedded in individual data frames and may be used for synchronization and/or channel estimation.

Processing may continue from block 202 to block 204, "excite the phased array", where a voltage-controlled phased array may be excited. For example, a voltage-controlled phased array may be excited with time-varying voltage levels. Such excitation may occur during reception of a preamble portion of the data frame.

Processing may continue from block 204 to block 206, "determine a directional power spectrum", where a directional power spectrum may be determined. In one example, the directional power spectrum of the received data frame signal may be determined as a function of the time-varying voltage levels. In another example, the directional power spectrum of the received data frame signal may be determined as a function of the incident directions of the received data frame signal.

Processing may continue from block 206 to block 208, "determine a direction", where a direction may be determined. For example, the direction may be determined based at least in part on the directional power spectrum. In one example, the direction of interest may be determined based at least in part on the directional power spectrum that provides the greatest signal power. In such a case, the direction of interest may be determined based at least in part on a peak of the directional power spectrum.

Processing may continue from block 208 to block 210, "determine a working voltage", where a working voltage may be determined. For example, the working voltage may be determined to correspond with the determined direction of interest. Such a working voltage may be utilized to excite the phased array in the determined direction of interest to receive a data symbol portion of the data frame.

In the example process 200, a scanning rate of the voltage-controlled phased array may be comparable to a sampling rate of the baseband signals. In such a case, the preamble portion usually includes a certain number of samples, and the scanning of the signals within the whole range of interest by blocks 202-210 may be performed at each frame. The operations of determining a directional power spectrum (block 206), determining a direction of interest (block 208), and/or determining a working voltage (block 210) may be based at least in part on an input of signal power data associated with the preamble portion of each data frame.

In operation, the example process 200 makes use of the fact that the signal traveling towards mobile wireless communication device 100 (FIG. 1) may be distributed among one or more directions. By pointing the antenna radiation pattern at a specific direction, it may be possible to reduce interference, reduce power consumption, and/or enhance communication quality.

Figure 3:
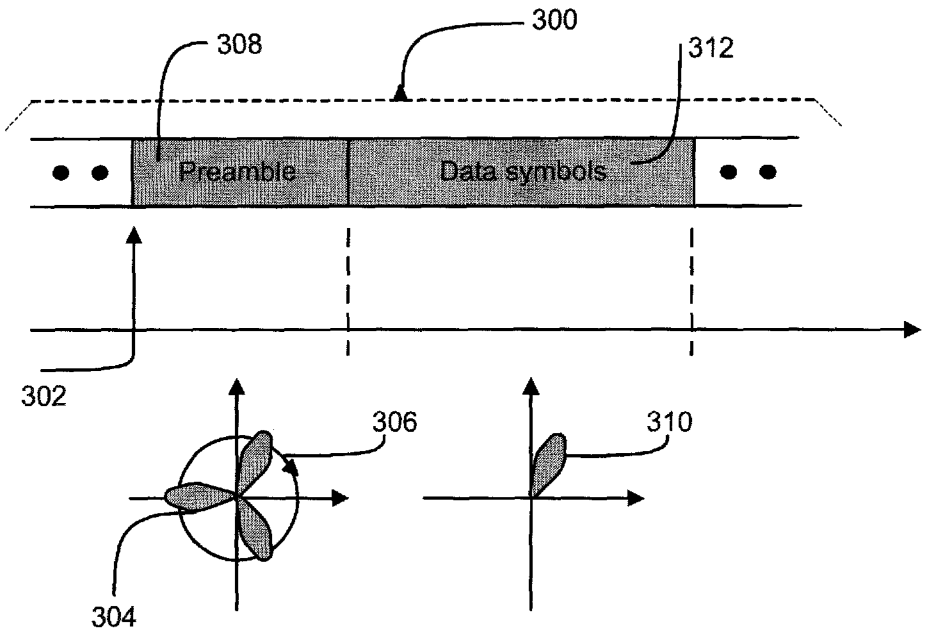
FIG. 3 illustrates a chart of an example data frame during directional adjustment of voltage-controlled phased array structures.

FIG. 3 illustrates a chart of an example data frame 300 during directional adjustment of voltage-controlled phased array structures in accordance with at least some embodiments of the present disclosure. As depicted, data frame 300 includes a preamble portion 308 and a data symbols portion 312. The start of preamble portion 308 is designated by a beginning 302. In the illustrated example, beginning 302 of data frame 300 may be determined. For example, beginning 302 may be determined based at least in part on one or more prefix symbols embedded in data frame 300.

The voltage-controlled phased array may be excited with time-varying voltage levels during reception of preamble portion 308 to form variations in radiation patterns 304. Such variations in radiation patterns may effectively form a beam scanning region 306. Such excitation may occur during reception of preamble portion 308 of data frame 300, which may start at beginning 302 of data frame 300.

A direction of interest 310 may be determined based at least in part on the directional power spectrum of received data frame 300. As noted above, the directional power spectrum of received data frame 300 signal may be determined as a function of the variations in radiation patterns 304 from the time-varying voltage levels.

A working voltage may be utilized to excite the phased array in the determined direction of interest 310 to receive data symbol portion 312 of data frame 300. For example, the working voltage may be determined from the time-varying voltage levels provide the greatest signal power according to the directional power spectrum. In such a case, the working voltage may be determined by the peak of the power spectrum.

Figure 4:
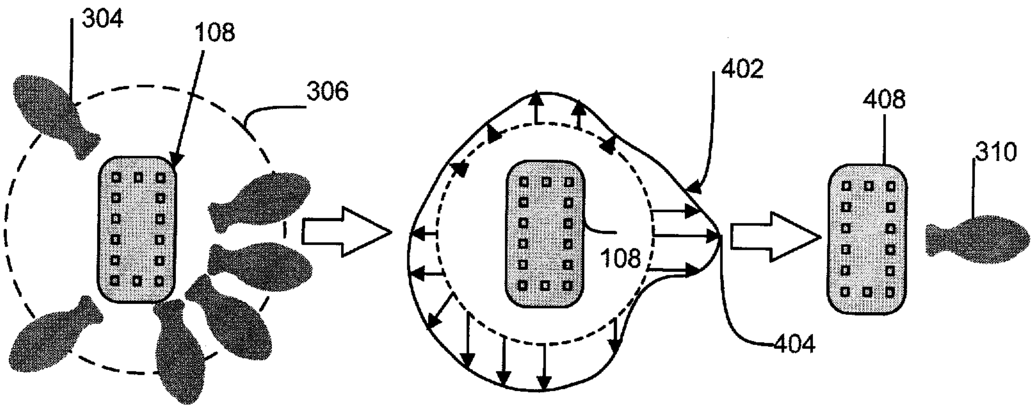
FIG. 4 illustrates an example of a radiation pattern of a voltage-controlled phased array during directional adjustment.

FIG. 4 illustrates an example of a radiation pattern of a voltage-controlled phased array during directional adjustment in accordance with at least some embodiments of the present disclosure. In the illustrated example, a voltage-controlled phased array 408 may be excited with time-varying voltage levels to form variations in radiation patterns 304. Such variations in radiation patterns 304 may form beam scanning region 306. Such excitation may be analyzed as a directional power spectrum 402. Direction of interest 310 may be determined based at least in part on directional power spectrum 402. In one example, the direction of interest may be determined based at least in part on a peak 404 of the directional power spectrum. A working voltage may be determined and utilized to excite voltage-controlled phased array 408 in the determined direction of interest 310 to receive a data symbol portion 312 (FIG. 3) of data frame 300 (FIG. 3). For example, the working voltage may be determined from the time-varying voltage levels provide the greatest signal power according to directional power spectrum 402. In such a case, the working voltage may be determined by the peak of power spectrum 404.

Figure 5:
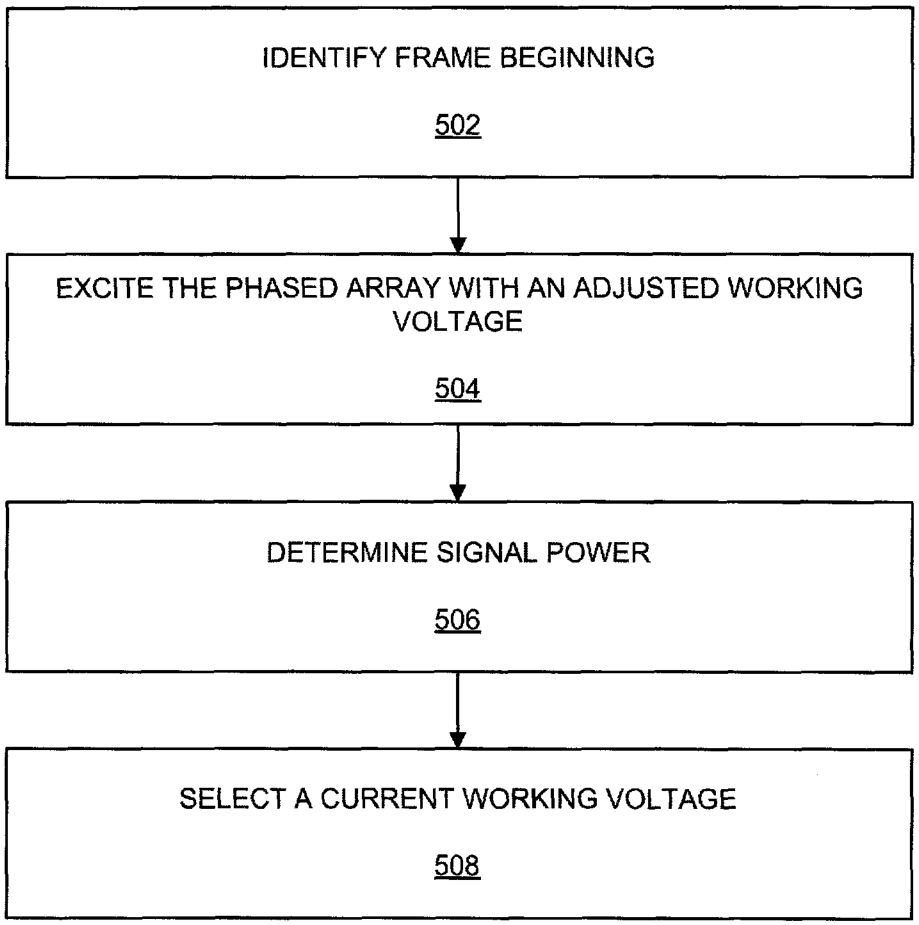
FIG. 5 illustrates an example process for directional adjustment of voltage-controlled phased array structures.

FIG. 5 illustrates an example process 500 for directional adjustment of voltage-controlled phased array structures in accordance with at least some embodiments of the present disclosure. In the illustrated example, process 500, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 5 may be practiced in various implementations. For example, although process 500, as shown in FIG. 5, depicts one particular order of blocks or actions, the order in which these blocks or actions are presented does not necessarily limit claimed subject matter to any particular order. Likewise, intervening actions not shown in FIG. 5 and/or additional actions not shown in FIG. 5 may be employed and/or some of the actions shown in FIG. 5 may be eliminated, without departing from the scope of claimed subject matter. Process 500 may include one or more of operations as illustrated by blocks 502, 504, 506, and/or 508.

As illustrated, process 500 may be implemented for directional adjustment of voltage-controlled phased array structures. Process 500 may be utilized in downlink communications, such as in mobile wireless communication device 100 (FIG. 1), for example. In the illustrated example, the scanning rate of the voltage-controlled phased array may be less than the sampling rate of the baseband signals. In such a case, a scan may be performed for a specific direction per data frame.

Processing may begin at block 502, "identify frame beginning", where a beginning of a data frame of a signal received by a mobile wireless communication device may be determined. Processing may continue from block 502 to block 504, "excite the phased array with an adjusted working voltage", where a voltage-controlled phased array may be excited with an adjusted working voltage. For example, a voltage-controlled phased array may be excited from a prior working voltage to an adjusted working voltage.

Processing may continue from block 504 to block 506, "determine signal power", where signal power may be determined. In one example, the signal power associated with the adjusted working voltage may be determined based at least in part on the received signals in the preamble period.

Processing may continue from block 506 to block 508, "determine a current working voltage", where a current working voltage may be determined. For example, the current working voltage may be determined based at least in part on a comparison of the determined signal power associated with the adjusted working voltage to a previously determined signal power associated with the prior working voltage. Accordingly, the current working voltage may be determined based at least in part on the working voltage that provides the greatest signal power. In one embodiment, in cases where the determined signal power associated with the adjusted working voltage is greater than the previously determined signal power associated with the prior working voltage, the adjusted working voltage may be determined as the current working voltage. In cases where the determined signal power associated with the adjusted working voltage is less than (or the two signal power values are equal), the prior working voltage may be maintained as the current working voltage. Such a current working voltage may be utilized to excite the phased array to receive a data symbol portion of the data frame.

In the proposed process 500, the scanning rate of the voltage-controlled phased array may be less than the sampling rate of the baseband signals. In such a case, a scan by blocks 502-508 may be performed for a specific direction per data frame.

Figure 6:
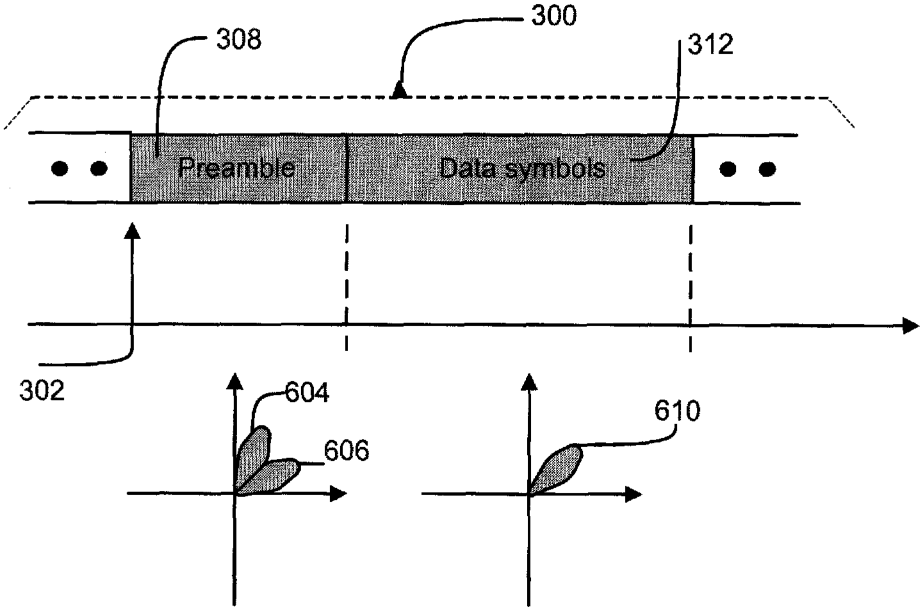
FIG. 6 illustrates a chart of an example data frame during directional adjustment of voltage-controlled phased array structures.

FIG. 6 illustrates a chart of an example frame during directional adjustment of voltage-controlled phased array structures in accordance with at least some embodiments of the present disclosure. In the illustrated example, a voltage-controlled phased array may be excited from a prior working voltage 604 to an adjusted working voltage 606. Such excitation may occur within a period from beginning 302 portion of data frame 300 and during reception of a preamble portion 308 of data frame 300. In this example, the prior working voltage 604 may be associated with a prior data frame (not shown) while the adjusted working voltage 606 may be associated with the current data frame 300.

A current working voltage 610 may be determined based at least in part on the working voltage that provides the greatest signal power. As noted above, the signal power may be determined as a function of the adjusted working voltage 606 during the preamble period. The current working voltage 610 may be utilized to excite the phased array to receive a data symbol portion 312 of the data frame 300.

Figure 7:
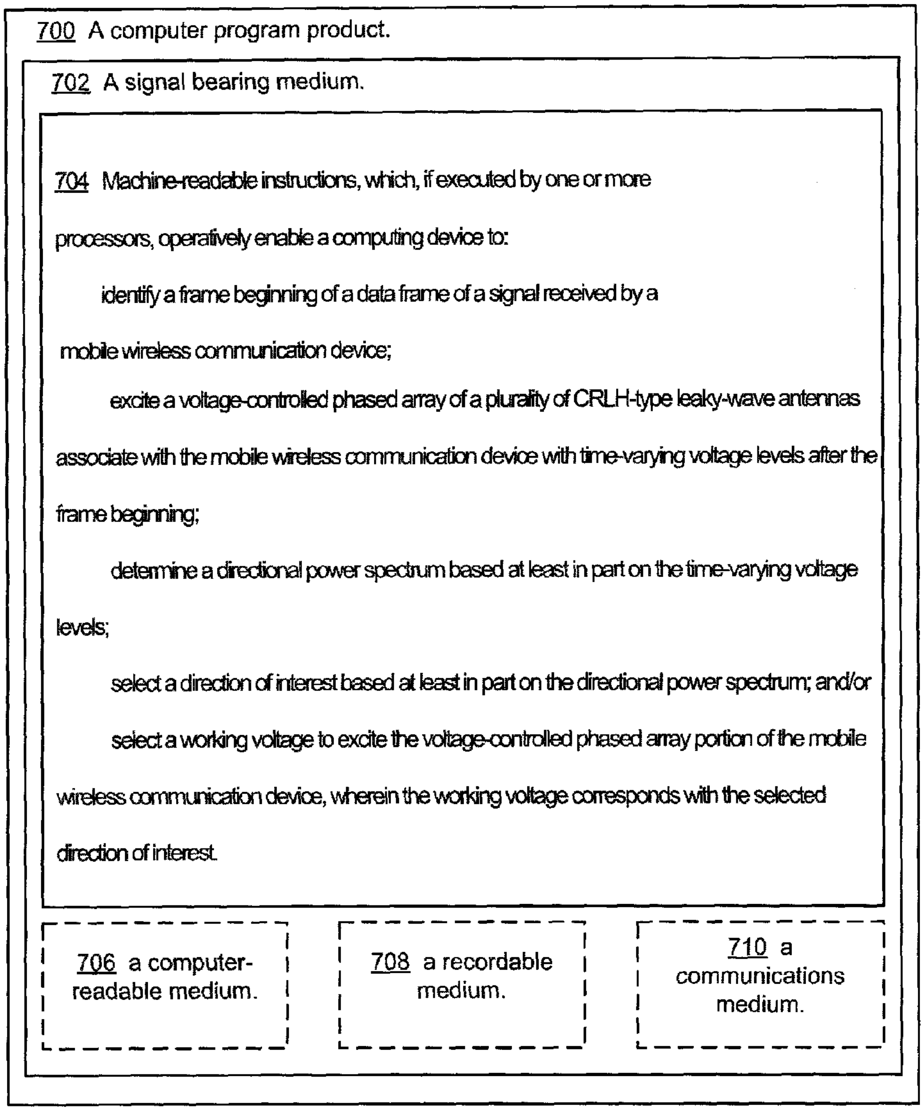
FIG. 7 is an illustration of an example computer program product.

FIG. 7 illustrates an example computer program product 700 that is arranged in accordance with at least some embodiments of the present disclosure. Computer program product 700 may include a signal bearing medium 702. Signal bearing medium 702 may include one or more machine-readable instructions 704, which, when executed by one or more processors, may operatively enable a computing device to provide the functionality described above with respect to FIG. 2 and/or FIG. 5. Thus, for example, referring to the system of FIG. 1, mobile wireless communication device 100 may undertake one or more of the actions shown in FIG. 2 and/or FIG. 5 in response to instructions 704 conveyed by medium 702.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communication link, a wireless communication link, etc.).

Figure 8:
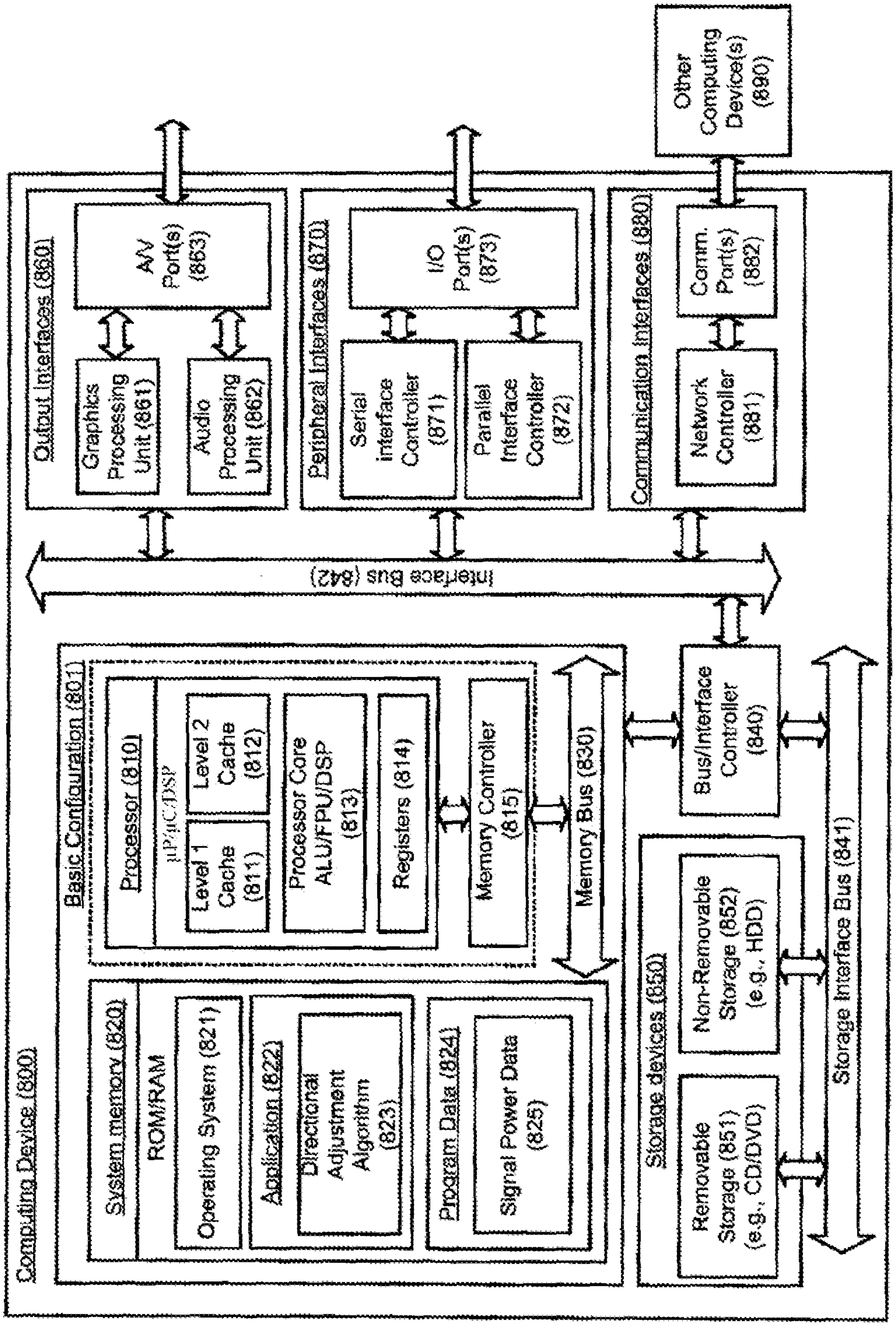
FIG. 8 is a block diagram of an illustrative embodiment of a computing device arranged in accordance with the present disclosure.

FIG. 8 is a block diagram of an illustrative embodiment of a computing device 800 that is arranged in accordance with the present disclosure. In one example basic configuration 801, computing device 800 may include one or more processors 810 and a system memory 820. A memory bus 830 can be used for communicating between the processor 810 and the system memory 820.

Depending on the desired configuration, processor 810 may be of any type including but not limited to a microprocessor (μP), a microcontroller (μC), a digital signal processor (DSP), or any combination thereof. Processor 810 can include one or more levels of caching, such as a level one cache 811 and a level two cache 812, a processor core 813, and registers 814. Processor core 813 can include an arithmetic logic unit (ALU), a floating point unit (FPU), a digital signal processing core (DSP Core), or any combination thereof. A memory controller 815 can also be used with processor 810, or in some implementations memory controller 815 can be an internal part of processor 810.

Depending on the desired configuration, the system memory 820 may be of any type including but not limited to volatile memory (such as RAM), non-volatile memory (such as ROM, flash memory, etc.) or any combination thereof. System memory 820 may include an operating system 821, one or more applications 822, and program data 824. Application 822 may include directional adjustment algorithm 823 that can be arranged to perform the functions, actions, and/or operations as described herein including the functional blocks, actions, and/or operations described with respect to process 200 of FIG. 2 and/or process 500 of FIG. 5. Program Data 824 may include signal power data 825 for use with the directional adjustment algorithm 823. In some example embodiments, application 822 may be arranged to operate with program data 824 on an operating system 821 such that implementations of directional adjustment of voltage-controlled phased array structures may be provided as described herein. This described basic configuration is illustrated in FIG. 8 by those components within dashed line 801.

Computing device 800 may have additional features or functionality, and additional interfaces to facilitate communications between basic configuration 801 and any required devices and interfaces. For example, a bus/interface controller 840 may be used to facilitate communications between basic configuration 801 and one or more data storage devices 850 via a storage interface bus 841. Data storage devices 850 may be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of device 800.

Computing device 800 may also include an interface bus 842 for facilitating communication from various interface devices (e.g., output interfaces, peripheral interfaces, and communication interfaces) to basic configuration 801 via bus/interface controller 840. Example output interfaces 860 may include a graphics processing unit 861 and an audio processing unit 862, which may be configured to communicate to various external devices such as a display or speakers via one or more A/V ports 863. Example peripheral interfaces 870 may include a serial interface controller 871 or a parallel interface controller 872, which may be configured to communicate with external devices such as input devices (e.g., keyboard, mouse, pen, voice input device, touch input device, etc.) or other peripheral devices (e.g., printer, scanner, etc.) via one or more I/O ports 873. An example communication interface 880 includes a network controller 881, which may be arranged to facilitate communications with one or more other computing devices 890 over a network communication via one or more communication ports 882. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 800 may also be implemented as a personal computer including both laptop computer and non-laptop computer configurations. In addition, computing device 800 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed is:

1. A method, comprising:

identifying a beginning of a data frame of a signal received by a mobile wireless communication device;

exciting, with time-varying voltage levels, a voltage-controlled phased array of a plurality of composite right/left-hand (CRLH)-type leaky-wave antennas associated with the mobile wireless communication device after the beginning of the data frame;

determining a directional power spectrum based at least in part on the time-varying voltage levels;

determining a direction based at least in part on the directional power spectrum; and determining a working voltage to excite the voltage-controlled phased array portion of the mobile wireless communication device, wherein the working voltage corresponds with the determined direction.

2. The method of claim 1, wherein the beginning of the data frame is determined based at least in part on one or more prefix symbols of the data frame.

3. The method of claim 1, wherein the excitation of the voltage-controlled phased array with time-varying voltage levels occurs during reception of a preamble portion of the data frame.

4. The method of claim 1, wherein the excitation of the voltage-controlled phased array with time-varying voltage levels comprises forming variations in radiation patterns associated with the voltage-controlled phased array.

5. The method of claim 1, wherein the directional power spectrum of the received data frame signal is determined as a function of the time-varying voltage levels.

6. The method of claim 1, wherein the directional power spectrum of the received data frame signal is determined as a function of an incident direction of the received data frame signal.

7. The method of claim 1, wherein the determined direction is determined based at least in part on a peak of the directional power spectrum.

8. The method of claim 1, further comprising receiving a data symbol portion of the data frame by the mobile wireless communication device during excitation of the voltage-controlled phased array with the working voltage in the determined direction.

9. The method of claim 1, wherein the excitation of the voltage-controlled phased array with time-varying voltage levels occurs during reception of a preamble portion of each individual data frame.

10. A method, comprising:

identifying a beginning of a current data frame of a signal received by a mobile wireless communication device;

exciting a voltage-controlled phased array of a plurality of CRLH-type leaky-wave antennas associated with the mobile wireless communication device from a prior working voltage to an adjusted working voltage after the beginning of the current data frame;

determining signal power associated with the adjusted working voltage; and determining a current working voltage to excite the voltage-controlled phased array portion of the mobile wireless communication device, wherein the current working voltage is based at least in part on a comparison of the determined signal power associated with the adjusted working voltage to a previously determined signal power associated with the prior working voltage.

11. The method of claim 10, wherein the beginning of the data frame is determined based at least in part on one or more prefix symbols of the current data frame.

12. The method of claim 10, wherein the excitation of the voltage-controlled phased array with the adjusted working voltage occurs during reception of a preamble portion of the current data frame, and wherein the prior working voltage is associated with a prior data frame.

13. The method of claim 10, wherein the signal power associated with the adjusted working voltage is determined during reception of a preamble portion of the current data frame.

14. The method of claim 10, wherein the adjusted working voltage is determined as the current working voltage when the determined signal power associated with the adjusted working voltage is greater than the previously determined signal power associated with the prior working voltage.

15. The method of claim 10, wherein the prior working voltage is determined as the current working voltage when the determined signal power associated with the adjusted working voltage is less than the previously determined signal power associated with the prior working voltage.

16. The method of claim 10, wherein the excitation of the voltage-controlled phased array with the adjusted working voltage occurs during reception of a preamble portion of each individual data frame.

17. The method of claim 10, further comprising receiving a data symbol portion of the current data frame by the mobile wireless communication device during excitation of the voltage-controlled phased array by the current working voltage.

18. A mobile wireless communication device, comprising:

a processor;

an RF transceiver operably coupled to the processor;

a voltage control unit operably coupled to the processor; and an antenna array operably coupled to the RF transceiver and the voltage control unit, wherein the antenna array comprises a voltage-controlled phased array of a plurality of CRLH-type leaky-wave antennas, wherein the voltage control unit is configured to excite the antenna array with time-varying voltage levels after a beginning of a data frame, and wherein the processor is configured to determine a working voltage to excite the antenna array in a direction of interest based at least in part on the time-varying voltage levels.

19. The mobile wireless communication device of claim 18, wherein the CRLH-type leaky-wave antennas are formed of two or more metamaterials.

20. An article comprising:

a signal bearing medium comprising machine-readable instructions stored thereon, which, if executed by one or more processors, operatively enable a computing device to:

identify a beginning of a data frame of a signal received by a mobile wireless communication device;

excite, with time-varying voltage levels, a voltage-controlled phased array of a plurality of CRLH-type leaky-wave antennas associated with a mobile wireless communication device after the beginning of the data frame;

determine a directional power spectrum based at least in part on the time-varying voltage levels;

determine a direction based at least in part on the directional power spectrum; and determine a working voltage to excite the voltage-controlled phased array portion of the mobile wireless communication device, wherein the working voltage corresponds with the determined direction.

21. The article of claim 20, further operatively enabling the computing device to: receive a data symbol portion of the data frame during excitation of the voltage-controlled phased array by working voltage in the determined direction.

22. A method, comprising:

identifying a beginning of a data frame of a signal received by a mobile wireless communication device;

exciting, with time-varying voltage levels, a voltage-controlled phased array of a plurality of antennas associated with the mobile wireless communication device after the beginning of the data frame; and determining a directional power spectrum based at least in part on the time-varying voltage levels.

23. The method of claim 22, wherein the beginning of the data frame is determined based at least in part on one or more prefix symbols of the data frame.

24. The method of claim 22, wherein the excitation of the voltage-controlled phased array with time-varying voltage levels occurs during reception of a preamble portion of the data frame.

25. The method of claim 22, wherein the excitation of the voltage-controlled phased array with time-varying voltage levels comprises forming variations in radiation patterns associated with the voltage-controlled phased array.

26. The method of claim 22, wherein the directional power spectrum of the received data frame signal is determined as a function of the time-varying voltage levels.

27. The method of claim 22, wherein the directional power spectrum of the received data frame signal is determined as a function of an incident direction of the received data frame signal.

28. The method of claim 22, further comprising receiving a data symbol portion of the data frame by the mobile wireless communication device during excitation of the voltage-controlled phased array with a working voltage in a determined direction based at least in part on the directional power spectrum.

29. The method of claim 22, wherein the excitation of the voltage-controlled phased array with time-varying voltage levels occurs during reception of a preamble portion of each individual data frame.

* * * * *